US011384576B2

(12) United States Patent
Escure et al.

(10) Patent No.: US 11,384,576 B2
(45) Date of Patent: Jul. 12, 2022

(54) HINGE FOR MAINTAINING POSTS IN LONGITUDINAL CONTACT

(71) Applicant: TransGard LLC, York, PA (US)

(72) Inventors: Ryan Escure, York, PA (US); William Reichard, York, PA (US)

(73) Assignee: TransGard LLC, York, PA (US)

( * ) Notice: Subject to any disclaimer, the term of this patent is extended or adjusted under 35 U.S.C. 154(b) by 511 days.

(21) Appl. No.: 16/521,123

(22) Filed: Jul. 24, 2019

(65) Prior Publication Data

US 2020/0032564 A1 Jan. 30, 2020

Related U.S. Application Data

(60) Provisional application No. 62/703,273, filed on Jul. 25, 2018.

(51) Int. Cl.

| | |
|---|---|
| ***E05D 5/02*** | (2006.01) |
| ***E05D 5/08*** | (2006.01) |
| ***E05D 3/02*** | (2006.01) |
| *A01K 3/00* | (2006.01) |
| *E04H 17/16* | (2006.01) |
| *E05D 9/00* | (2006.01) |

(52) U.S. Cl.
CPC ................. *E05D 5/08* (2013.01); *E05D 3/02* (2013.01); *A01K 3/005* (2013.01); *E04H 17/163* (2013.01); *E05D 9/005* (2013.01)

(58) Field of Classification Search
CPC . Y10T 16/525; Y10T 16/5253; Y10T 16/534; Y10T 16/31; Y10T 16/558; Y10T 16/5595; E05D 5/00; E05D 5/06; E05D 5/08; E05D 5/0215; E05D 3/02; E05D 9/005; E06B 11/02; E04H 17/1447; E04H 17/1448; E04H 17/20; E04H 17/24; E04H 17/163; E04H 17/1473
See application file for complete search history.

(56) References Cited

U.S. PATENT DOCUMENTS 1,343,463 A * 6/1920 Meredith .............. F16L 55/172 403/309
1,441,154 A * 1/1923 Johnson ................ F16L 33/035 16/109
4,821,382 A * 4/1989 Puschkarski .............. E05D 1/04 24/339

(Continued)

*Primary Examiner* — Chuck Y Mah
(74) *Attorney, Agent, or Firm* — Troutman Pepper Hamilton Sanders LLP

(57) ABSTRACT

A hinge is arranged to move two panels, such as a stationary fence panel and a gate, between an open position and a closed position. When the hinge is in a closed position, the posts to which the hinge is attached are maintained in substantial contact along substantially the entire longitudinal length of the posts, thereby preventing small animals from passing through the fence. The hinge has two hinge halves, each having a finger portion arranged to interlace with a finger portion of the other hinge half, each finger of the finger portions defining an opening, and an arcuate post-engaging portion extending for at least 90 degrees and defining a longitudinal opening for receiving an end post, wherein each longitudinal opening faces the other when the hinge is in a closed position. The hinge also has a hinge pin passing through and within the openings allowing rotation.

19 Claims, 5 Drawing Sheets

(56) References Cited

U.S. PATENT DOCUMENTS

| | | | | | |
|---|---|---|---|---|---|
| 5,331,725 | A * | 7/1994 | Chou | F16B 2/22 | |
| | | | | 24/339 | |
| D379,753 | S * | 6/1997 | Honda | D8/323 | |
| 7,665,187 | B1 * | 2/2010 | Elowsky | E05D 3/02 | |
| | | | | 16/390 | |
| D697,592 | S * | 1/2014 | Hebert | D23/259 | |
| 9,198,549 | B1 * | 12/2015 | Ajello | E05D 5/14 | |
| 9,637,963 | B1 * | 5/2017 | Heichel | E05D 15/26 | |
| 2012/0216375 | A1 * | 8/2012 | Druhl | A01D 34/82 | |
| | | | | 24/456 | |
| 2012/0227221 | A1 * | 9/2012 | Whitaker | F16B 2/10 | |
| | | | | 29/525.08 | |
| 2012/0286224 | A1 * | 11/2012 | Duffy | E04H 17/1439 | |
| | | | | 256/22 | |
| 2015/0143665 | A1 * | 5/2015 | Lindstrom | E05D 1/04 | |
| | | | | 16/225 | |

* cited by examiner

HINGE FOR MAINTAINING POSTS IN LONGITUDINAL CONTACT

CROSS-REFERENCE TO RELATED APPLICATIONS

This application claims the benefit of priority of U.S. Patent Application Ser. No. 62/703,273, filed on Jul. 25, 2018, entitled "Hinge for Maintaining Posts in Longitudinal Contact," the entire contents of which is hereby incorporated by reference herein.

TECHNICAL FIELD

This disclosure relates to a hinge. Particularly, this disclosure relates to a hinge design that allows for the posts to which the hinge is attached to be held in close proximity, when closed. In some embodiments, the posts are touching, or within 1 mm of each other, when closed. This prevents most, if not all, small animals from passing between the posts when the hinge is closed.

BACKGROUND

Perimeter fencing, such as electrified fences, are used to keep trespassers from entering protected areas. To be effective, non-electrified spaces must be smaller than the smallest intruder, otherwise they can avoid or escape the electric deterrent. In the case of electrified fences protecting outdoor structures, such as power stations, the intruder can be a small rodent, or in some environments, a snake. Such small creatures can often pass between the posts of closed gates provided to allow human access.

The hinge design described herein minimizes the gap created by a hinge and therefore minimized the amount and frequency with which even small creatures will defeat the perimeter fencing.

SUMMARY

In some embodiments, the present disclosure describes a hinge. The hinge includes two hinge halves. Each hinge half includes a finger portion arranged to interlace with a finger portion of the other hinge half, each finger of the finger portions defining an opening and an arcuate post-engaging portion extending for at least 90 degrees and defining a longitudinal opening for receiving an end post, wherein each longitudinal opening faces the other when the hinge is in a closed position. The hinge also includes a hinge pin passing through and within the openings of the interlaced fingers of the finger portions thereby allowing rotation of at least one hinge half about the hinge pin with respect to the other hinge half. The hinge is configured such that when the hinge is in a closed position, the posts to which the hinge is attached are maintained in substantial contact along substantially the entire longitudinal length of the posts.

In other embodiments, the present disclosure describes a gate assembly as part of a fence. The gate assembly includes a first fence panel connected to a second fence panel, each including an end post. The end posts are connected by a hinge consistent with disclosed embodiments such that the end posts are maintained in substantial contact along substantially the entire length of the end post.

DETAILED DESCRIPTION

Perimeter fencing such as electrified fencing is helpful in keeping wildlife from entering and damaging outdoor structures such as power plants or electrical sub-stations. When dealing with snakes or other animals that can maneuver through very small cracks, the tolerances become very tight. In case of fire or other emergency, hinged exit points at various points in a fence panel that would allow for a secondary exit or entrance are necessary. The gap created between posts at these hinged exit points need to have a tight tolerance similar to the rest of the panel in order to keep out small animals and other critters.

Figure 1:
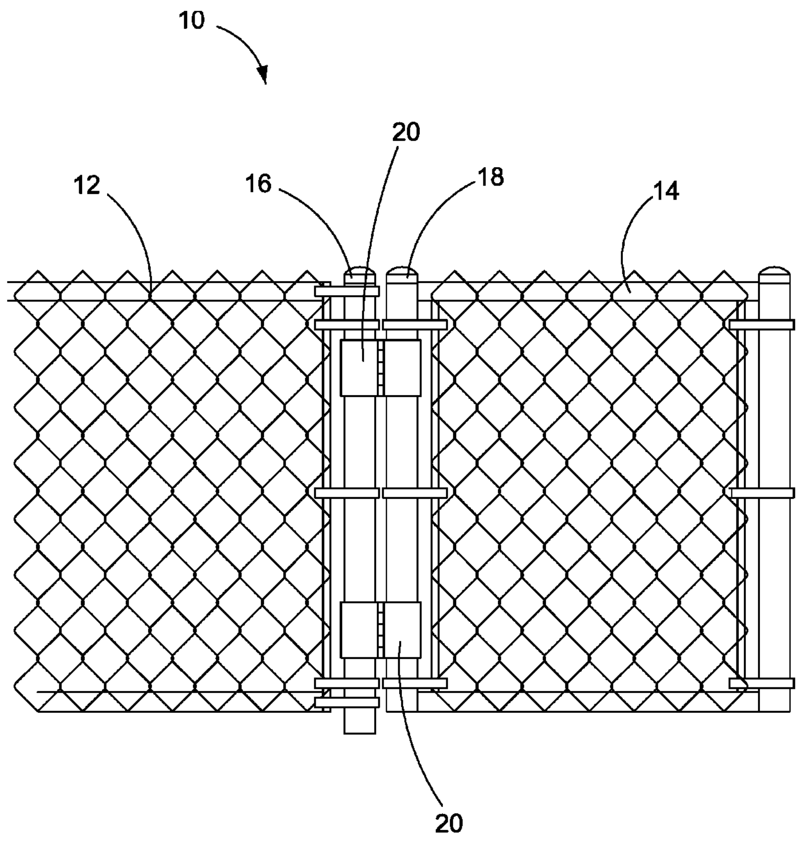
(Prior Art) FIG. 1
FIG. 1 is a front view of a fence including a traditional hinge illustrating a gap between the hinged posts.
Figure 2:
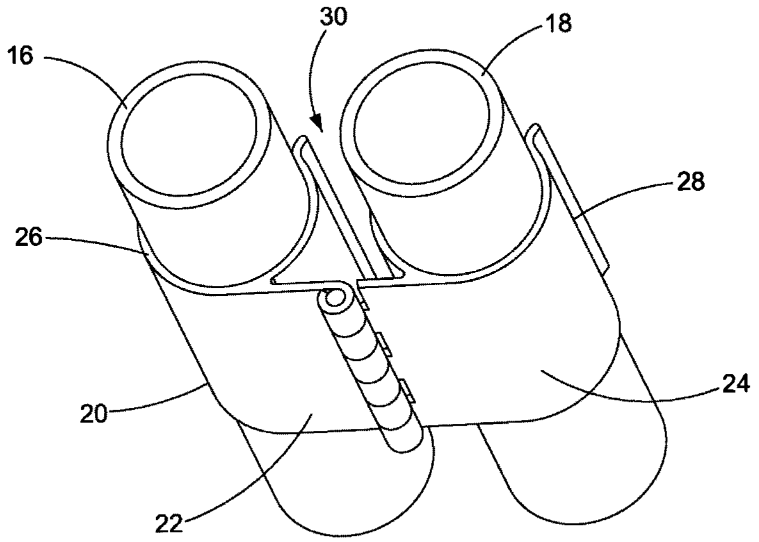
(Prior Art) FIG. 2
FIG. 2 is a close-up view of a traditional hinge and the longitudinal gap formed between pipes hinged with such a hinge.
Figure 3:
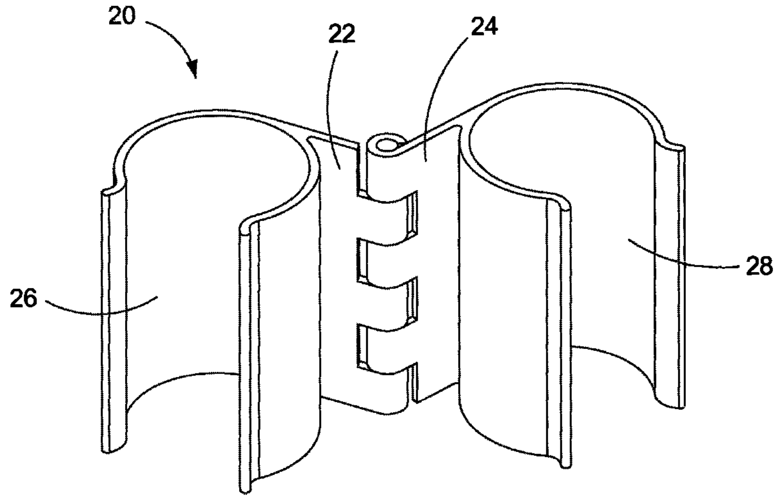
(Prior Art) FIG. 3
FIG. 3 is another view of a traditional hinged.
Figure 4:
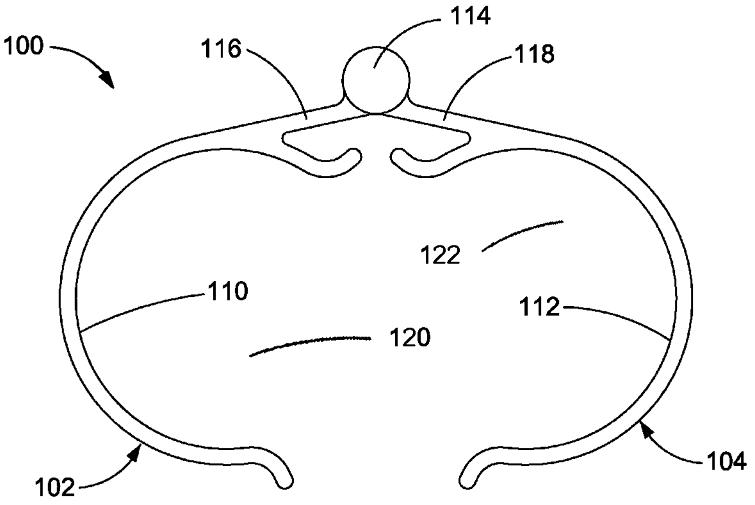
FIG. 4 is an top end view of a hinge in accordance with some embodiments described herein.

FIGS. 1-3 are depictions of a fence 10 and a prior art traditional hinge 20. The fence 10 includes two panels 12, 14 having respective end posts 16, 18. The end posts 16, 18 are connected by the traditional hinge 20. The hinge 20 enables the first panel 10 and second panel 12 to pivot relative to each other (e.g., the second panel 14 may be a gate that opens with respect to a stationary first panel 12).

In one example, the traditional hinge 20 shown in FIG. 2 may be a commercially available hinge that connects the two end posts 16, 18. As can be seen, the portions of the hinge 20 engaging the end posts 16, 18 add thickness to the posts and create a space between the pipes due to their alignment. As shown in FIGS. 2-3, the hinge portion of the traditional hinge 20 is formed by two flanges 22, 24 that extend between the post holding portions 26, 28, thereby leading to a gap 30 between the end posts 16, 18. This gap 30 enables small animals and other critters to slip through the fence 10.

Applicant has found that by rotating the opening of the hinge, such that pipe-holding portions of the hinge need not contact one another, the end posts 16, 18 can be brought into close proximity with each other, limited practically only by the need to not interfere with the rotation. In some instances, the end posts 16, 18 may actually touch each other along their lengths. FIGS. 4-8 depict an exemplary embodiment a hinge 100, consistent with disclosed embodiments.

In some embodiments, the hinge 100 comprises two hinge halves 102, 104, each comprising a finger section 106, 108 and post-engaging portion 110, 112, respectively. Each finger section 106, 108 has an opening adapted to accept a hinge pin 114. A hinge arm 116, 118 extends from the at least one finger section 106, 108 and leads to a respective arcuate post-engaging portion 110, 112. The hinge arms 116, 118 are not aligned (e.g., not collinear or coplanar) in the closed position, in at least one embodiment. The post-engaging portions 110, 112 span at least about 90° but not more than about 270°, thereby leaving an opening 120, 122 to accept a respective end post 16, 18. In some embodiments, the post-engaging portions 110, 112 span between 90° and 180°. In other embodiments, the post-engaging portions 110, 112 span between 180° and 270°. The fingers of each finger section 106, 108 are arranged such that they interlace with each other and the hinge pin 114 may be placed within the openings thereof to secure the two hinge halves together, for rotation about the hinge pin 114.

Figure 5:
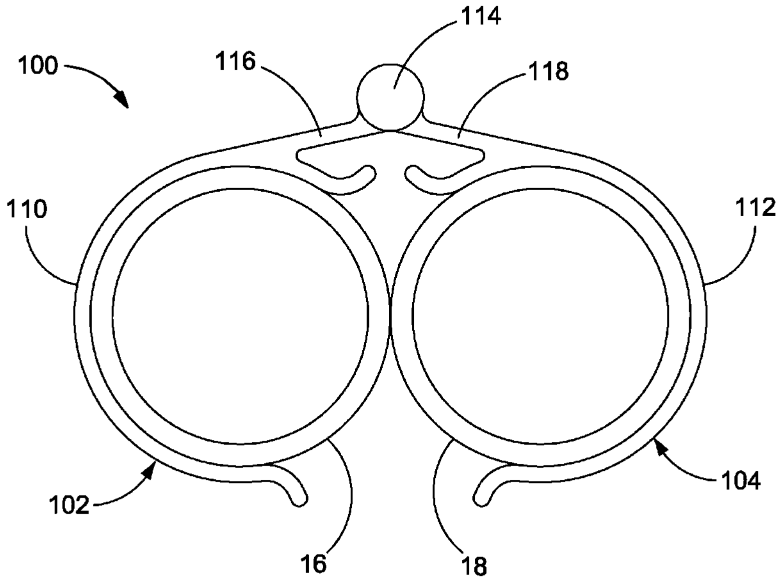
FIG. 5 is a top end view of a hinge in accordance with some embodiments described herein, with the hinged pipes shown.
Figure 6:
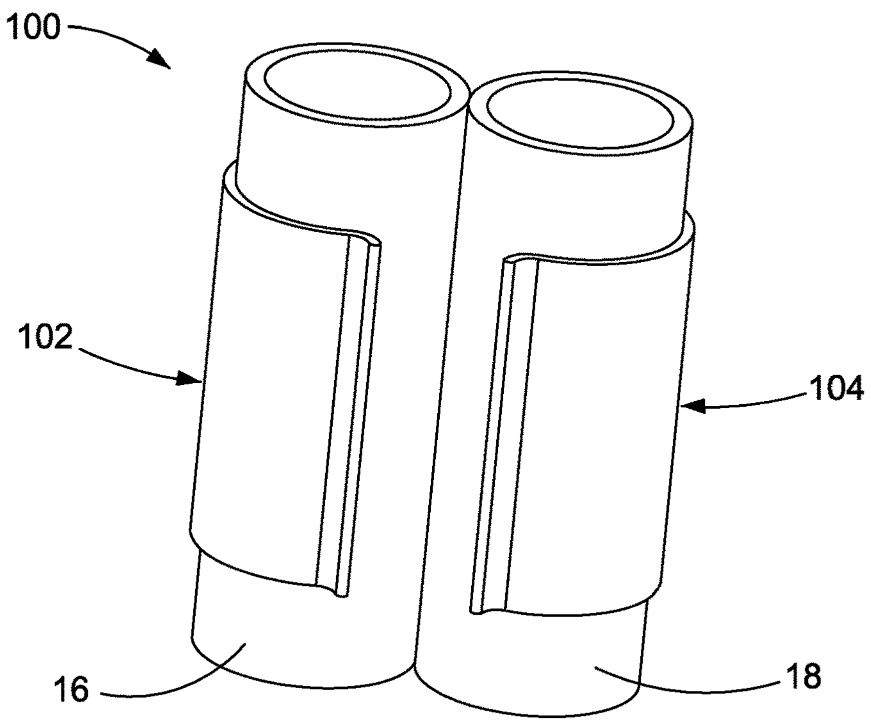
FIG. 6 is a first side view of a hinge in accordance with some embodiments described herein, with the hinged pipes shown.
Figure 7:
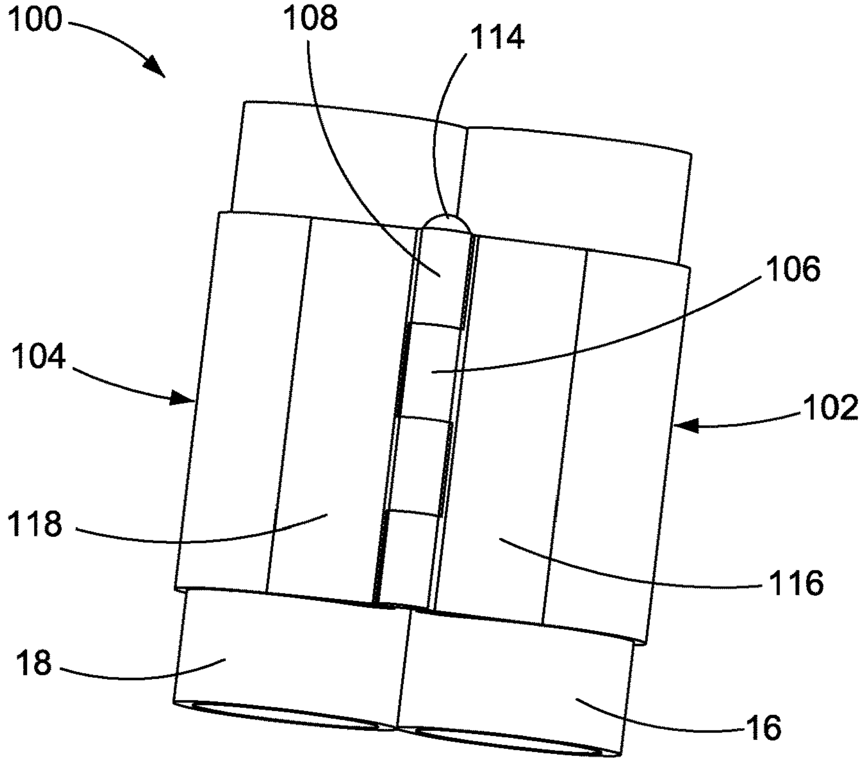
FIG. 7 is a second side view, opposite that of FIG. 6, of a hinge in accordance with some embodiments described herein, with the hinged pipes shown.
Figure 8:
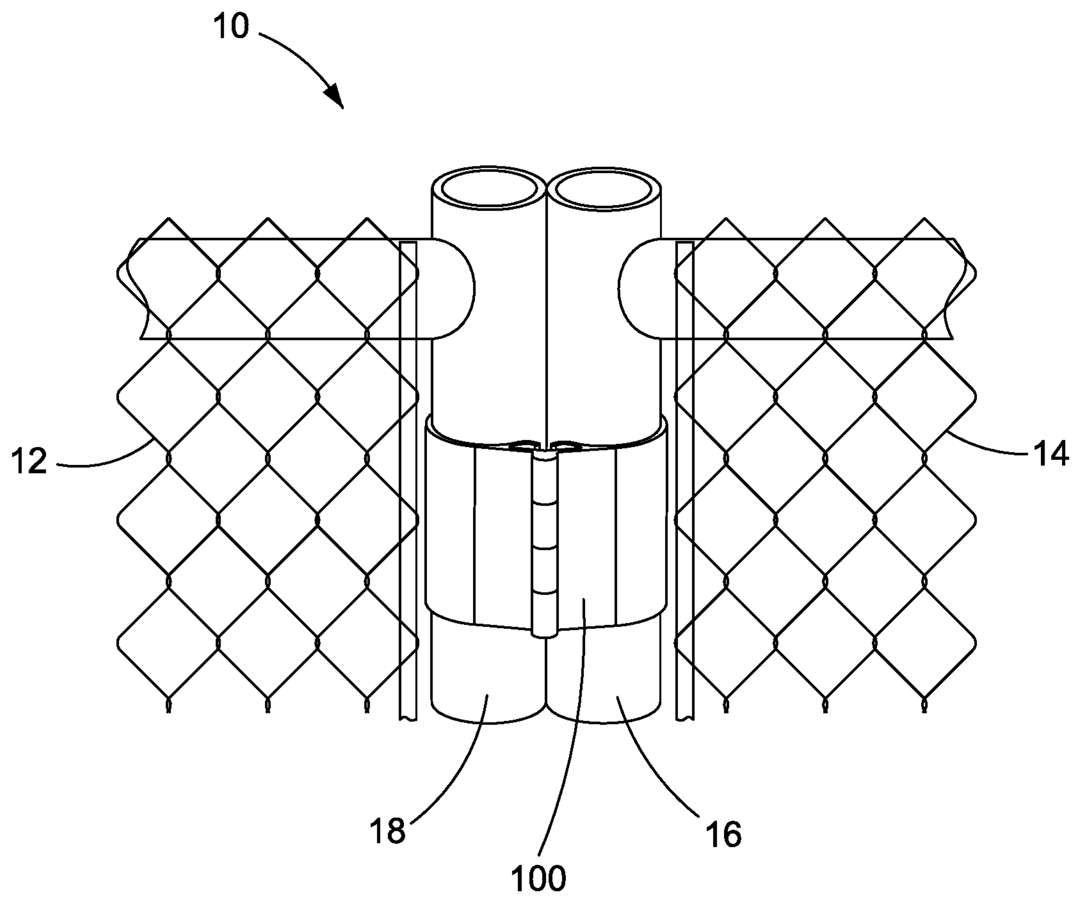
FIG. 8 is a front view of a fence including a hinge and post arrangement in accordance with some embodiments described herein, illustrating the longitudinal contact between the hinged posts.

The arcuate post-engaging portions 110, 112 of each hinge half 102, 104 are arranged such that the openings 120, 122 face each other in the closed position. This arrangement avoids the finger portions 106, 108 aligning with one another (i.e., on the same line like the flanges 22, 24 shown in FIG. 2) which therefore eliminates the extra depth around the hinge and resultant gap between the end posts 16, 18 (e.g., as shown in FIGS. 1-2). In other words, the finger portions 106, 108 are angled with respect to each other when the hinge 100 is in the closed position and the end posts 16, 18 are in contact with each other (e.g., as shown in FIG. 5). The disclosed hinge 100 allows the end posts 16, 18 (e.g. 2 inch PVC pipes) to contact with each other, or otherwise very close, e.g. less than 1 mm apart, when the fence panels 12, 14 are aligned with each other (e.g., a gate is in a closed position). The close positioning of the end posts 16, 18 in this arrangement minimizes or prevents many small creatures from be able to pass through the gate, even at the hinge.

It should be appreciated that the radius r, $r_a$ of the post-engaging portions 110, 112 should be similar to the outside radius, $r_1$, $r_{1a}$ of the pipes to be hinged, or slightly smaller. Each portion of the hinge should be sized taking these dimensions in mind, and allowing for the two end posts to come into contact along substantially their entire longitudinal dimension.

Although in most applications the radius of each post, and thus the radius of each post-engaging portion will be approximately equal. It is possible that the concepts and techniques described herein could apply to pipes having dissimilar dimensions. To accommodate such an arrangement, the size of one hinge half, and the length of the hinge arm would be adjusted accordingly along with the radius of the post-engaging portion of the hinge half.

The size of the opening defined by the post-engaging portion is selected to allow for secure holding of the post via flex fit, friction fit, and/or by a screw or other fastener. In some embodiments, the flexibility of the hinge material will simultaneously allow a post to be inserted and hold it securely in place via pressure and or friction. Adhesives or other securing measures such as screws may be used in addition to or instead of such a flex or friction fit, so long as the screws do not interfere with the rotational movement.

Also contemplated herein are pre-fabricated gate and post portions comprising a gate, a mounting post, and at least one hinge, such as described above, interconnecting the two. The gate comprises a hinge post, which, as the name suggests, is interconnected to the mounting post via the at least one hinge such that when closed, the hinge post and the mounting post are in contact or close proximity (<1 mm) to one another along substantially their entire longitudinal length. As will be appreciated, two or more hinges are preferred. An elongated hinge akin to a piano hinge, is also contemplated, and such an arrangement provides a further barrier to entry.

The hinge itself may be made of any material, although aluminum seems to be a natural choice. Plastics, steel, stainless steel, or other rigid materials may be used. With respect to the posts, while this description contemplates the use of cylindrical PVC piping, any cylindrical post, solid or hollow, may be used, including wood, metal, composites or other materials. The posts, although contemplated herein to be cylindrical (having a circular cross-section), other shapes may be employed, so long as they can be rotated through hinge action to come into close proximity with one another along substantially their entire longitudinal length.

These and other variation will be readily apparent without straying from the scope and spirit of the close-proximity hinge apparatus describe herein.

What is claimed is:

1. The hinge comprising:

two hinge halves, each hinge half comprising:

a finger portion arranged to interlace with a finger portion of the other hinge half, each finger of the finger portions defining an opening; and an arcuate post-engaging portion extending for at least 90 degrees and defining a longitudinal opening for receiving an end post, wherein each longitudinal opening faces the other when the hinge is in a closed position; and a hinge pin passing through and within the openings of the interlaced fingers of the finger portions thereby allowing rotation of at least one hinge half about the hinge pin with respect to the other hinge half, wherein when the hinge is in a closed position, the posts to which the hinge is attached are maintained in substantial contact along substantially the entire longitudinal length of the posts.

2. The hinge of claim 1, wherein a span of each said arcuate post-engaging portion is between 90° and 270°.

3. The hinge of claim 2, wherein a span of each said arcuate post-engaging portion is between 90° and 180°.

4. The hinge of claim 2, wherein a span of each said arcuate post-engaging portion is between 180° and 270°.

5. The hinge of claim 1 wherein each of said arcuate post-engaging portions are sized to hold the same size post.

6. The hinge of claim 1 wherein each of said arcuate post-engaging portions are sized to hold a different size post.

7. The hinge of claim 1 wherein at least one of said hinge halves attaches to a post by flex fit, friction fit, or mechanical fastener.

8. The hinge of claim 1 wherein said hinge halves are made out of aluminum, plastic, steel, or other rigid material.

9. The hinge of claim 1 wherein at least one of the arcuate post-engaging portions accepts at least one non-cylindrical post.

10. The hinge of claim 1 wherein the finger portions are angled with respect to each other when the hinge is in the closed position.

11. A gate assembly of a fence, comprising a two fence panels, each comprising an end post; the end posts being connected by a hinge, the hinge comprising two hinge halves, each hinge half comprising:

a finger portion arranged to interlace with a finger portion of the other hinge half, each finger of the finger portions defining an opening; and an arcuate post-engaging portion extending for at least 90 degrees and defining a longitudinal opening for receiving an end post, wherein each longitudinal opening faces the other when the hinge is in a closed position; and a hinge pin passing through and within the openings of the interlaced fingers of the finger portions thereby allowing rotation of at least one hinge half about the hinge pin with respect to the other hinge half, wherein when the hinge is in a closed position, the end posts of the fence panels are maintained in substantial contact along substantially the entire longitudinal length of the end posts.

12. The gate assembly of claim 11, wherein the end posts are connected by only one hinge.

13. The gate assembly of claim 12, wherein the hinge is elongated to extend a substantial portion of the end posts.

14. The gate assembly of claim 11, wherein the end posts have the same circumferential size.

15. The gate assembly of claim 11, wherein the end posts have different circumferential sizes.

16. The gate assembly of claim 11, wherein at least one of said hinge halves attaches to a respective end post by flex fit, friction fit, or mechanical fastener.

17. The gate assembly of claim 11, wherein said hinge halves are made out of aluminum, plastic, steel, or other rigid material.

18. The gate assembly of claim 11, wherein at least one of the end posts is non-cylindrical.

19. The gate assembly of claim 11, wherein the finger portions are angled with respect to each other when the hinge is in the closed position.

* * * * *